United States Patent
Nimashakavi et al.

(10) Patent No.: US 8,856,735 B2
(45) Date of Patent: Oct. 7, 2014

(54) SYSTEM AND METHOD OF GENERATING REST2REST SERVICES FROM WADL

(75) Inventors: Kirankumar Nimashakavi, Fremont, CA (US); Ming Yin, Beijing (CN); Rotter Zeng, Beijing (CN); Zhe Yang Li, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 13/557,470

(22) Filed: Jul. 25, 2012

(65) Prior Publication Data

US 2014/0033170 A1 Jan. 30, 2014

(51) Int. Cl.
*G06F 9/44* (2006.01)
*G06F 9/45* (2006.01)

(52) U.S. Cl.
USPC ............ 717/108; 717/106; 717/116; 717/140

(58) Field of Classification Search
None
See application file for complete search history.

(56) References Cited

U.S. PATENT DOCUMENTS

| | | | |
|---|---|---|---|
| 6,760,417 B1 | 7/2004 | Wallenius | |
| 7,136,913 B2 | 11/2006 | Linderman | |
| 7,483,438 B2 | 1/2009 | Serghi et al. | |
| 8,296,409 B2 | 10/2012 | Banerjee et al. | |
| 8,510,762 B1 * | 8/2013 | Gregorio et al. | 719/328 |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2007/0106801 A1 | 5/2007 | Jansson | |
| 2007/0143470 A1 | 6/2007 | Sylvain | |
| 2008/0103923 A1 | 5/2008 | Rieck et al. | |
| 2009/0268715 A1 | 10/2009 | Jansson | |
| 2009/0327868 A1 * | 12/2009 | Tsukikawa | 715/239 |
| 2010/0299677 A1 * | 11/2010 | Wolff | 719/315 |
| 2011/0082920 A1 | 4/2011 | Bhattacharya et al. | |
| 2011/0161477 A1 * | 6/2011 | Kowalski | 709/223 |
| 2011/0270895 A1 * | 11/2011 | Shelby | 707/803 |
| 2013/0013688 A1 * | 1/2013 | Wang et al. | 709/204 |
| 2013/0019314 A1 * | 1/2013 | Ji et al. | 726/25 |
| 2013/0160130 A1 * | 6/2013 | Mendelev et al. | 726/25 |

OTHER PUBLICATIONS

Thomas Steiner, "Automatic Multi Language Program Library Generation for REST APIs", 2007. pp. 1-49.*
Chaitanya Guttula, "Radiantweb: A Tool Facilitating Semantic Annotation of Web Services", 2008, pp. 1-47.*
Bea, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, ORACLE, 94 pages, Jan. 2009.

* cited by examiner

*Primary Examiner* — Isaac T Tecklu
(74) *Attorney, Agent, or Firm* — Meyer IP Law Group (57) ABSTRACT

A system and method is provided for generating a RESTful communication service which offers REST2REST functionality seamlessly with automatic support for the API agnostic features such as policy enforcement, load balancing, routing, failover, logging, accounting, format conversion (XML2JSON,JSON2XML) etc. Such a system can include one or more applications, executing on one or more application servers. The system can also include a WADL plug-in which generates code for the RESTful communication service from Web Application Description Language files (WADL) which define the service interface and internal templates which define the code logic. The method offers rapid and efficient generation of REST APIs supporting API agnostic features, automatic REST API code generation from WADL files, and translation from WADL to WSDL.

16 Claims, 5 Drawing Sheets

SYSTEM AND METHOD OF GENERATING REST2REST SERVICES FROM WADL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method of generating REST2REST services from Web Application Description Language ("WADL") data.

BACKGROUND

Service providers may have existing third-party or proprietary applications or platforms that communicate using Representational States Transfer ("REST") web services. A services gatekeeper functionality can be integrated with existing applications that support REST interfaces by creating a RESTful communication service which conforms to the REST constraints. A services gatekeeper mediates traffic between users and existing REST infrastructure allowing the application of service level agreements, policy enforcement, security, alarms, and statistics for more control over communication services. However, customers/developers are required to manually code the REST application programming interfaces (APIs) for the REST web services that support platform agonistics features such as policy enforcement, load balancing, routing, failover, logging, accounting, format conversion (XML2JSON,JSON2XML) etc. Implementing these features in each REST API is time consuming and inefficient.

SUMMARY

In accordance with various embodiments, the present invention provides a system and method is provided for generating a RESTful communication service which offers REST2REST functionality seamlessly with automatic support for the API agnostic features such as policy enforcement, load balancing, routing, failover, logging, accounting, format conversion (XML2JSON,JSON2XML) etc. Such a system can include one or more applications, executing on one or more application servers. The system can also include a compiler which generates REST API code for the RESTful communication service from WADL file(s) which define the service interface and internal templates which define the code logic. The method offers rapid and efficient generation of REST APIs for RESTful web services supporting API agnostic features, automatic REST API code generation from WADL files, and translation from WADL files to Web Service Description Language file ("WSDL").

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

Web Application Description Language ("WADL") is an XML-based file format that provides a machine-readable description of HTTP-based web applications. WSDL is an XML-based format for describing network services as a set of endpoints operating on messages containing either document-oriented or procedure-oriented information. Both WADL and WSDL are platform and independent languages. Representational State Transfer (REST) is a style of software architecture for distributed systems such as the World Wide Web. Conforming to the REST constraints is generally referred to as being "RESTful". RESTful web services are implemented in a REST API (application programming interface).

Embodiments of the present invention provide a system and method for generating a RESTful communication service which offers REST2REST functionality seamlessly with automatic support for the API agnostic features such as policy enforcement, load balancing, routing, failover, logging, accounting, format conversion (XML2JSON,JSON2XML) etc. The system includes a WADL plug-in which generates code for the RESTful communication service from WADL which defines the service interface and internal templates which define the code logic. The method offers rapid and efficient generation of REST APIs supporting API agnostic features, automatic REST API code generation from WADL files, and translation from WADL to WSDL. The system avoids the need for manual coding of the REST APIs for the RESTful web services. Thus, the REST APIs can be implemented quickly and efficiently."

Figure 1A:
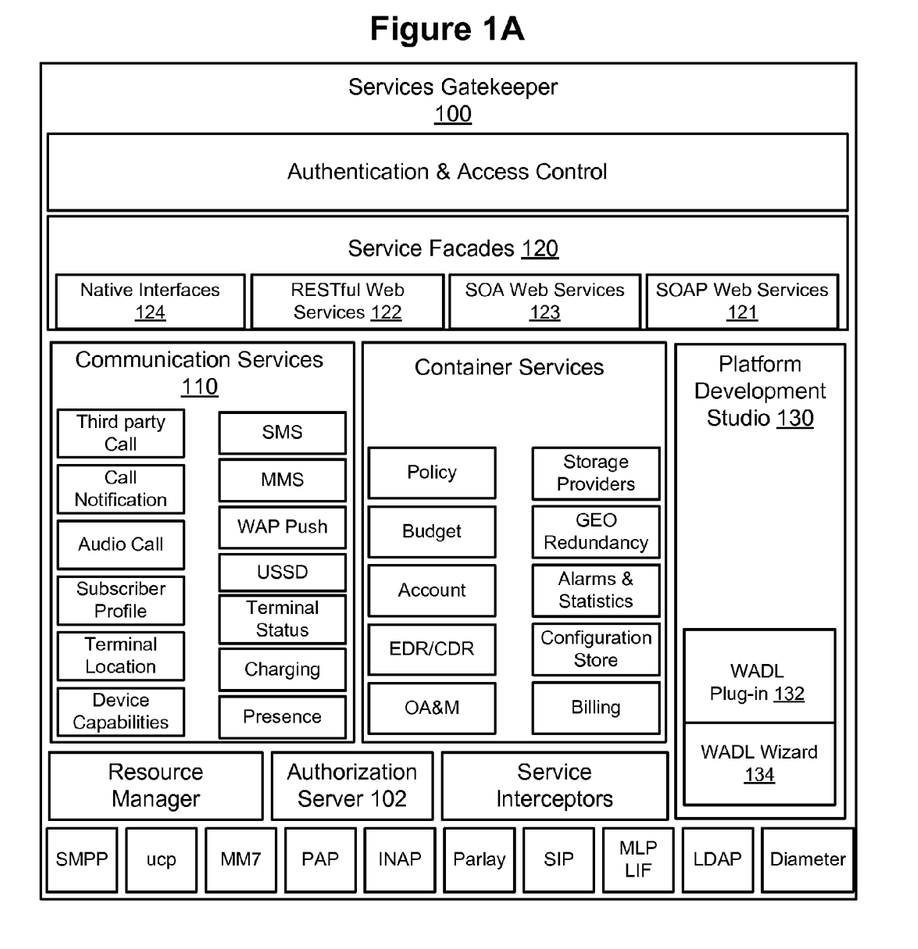
FIG. 1A shows a services gatekeeper, in accordance with an embodiment of the invention.

FIG. 1A shows elements of a services gatekeeper 100 in accordance with an embodiment of the invention. As shown in FIG. 1A, services gatekeeper 100 controls access to a plurality of communications services 110. Services gatekeeper 100 facilitates the operator's need to provide third party service provider access to its key value-added network capabilities as well as third party APIs in a controlled, secure, optimized, and automated fashion, while providing robust customization and extensibility. Services gatekeeper 100 delivers a converged service exposure layer of service facades 120, providing operators the choice and flexibility of using traditional SOAP Web Services 121, RESTful Web Services 122, Service Oriented Architecture (SOA) Web Services 123, and native telecommunication interfaces 124 to expose their network capabilities to third party partners. The exposure platform is based on IT, Web and telecommunication industry standards including, for example, Java Platform, Enterprise Edition (Java EE), Service Oriented Architecture (SOA), Parlay X, Session Initiation Protocol (SIP), Diameter, OAuth, Simple Object Access Protocol (SOAP), and Representational State Transfer (REST)-ful Web Services. Services gatekeeper 100 also includes an authorization server 102 which provides an authorization service.

Services gatekeeper 100 includes pre-built, specialized components, the above communication services 110, to allow third party developers and application partners to easily access the operator's telecommunication network capabilities. The network capabilities supported by the communication services include messaging, call control, terminal location, payment, profile and presence. These communication services 110 APIs expose user information such as charging capability, location, and profile to third party applications. Services gatekeeper 100 provides flexibility and choice in how third party developers and applications can access the operator's network through multiple types access interfaces, the above, service facades 120.

Services gatekeeper 100 supports two types of RESTful communication services. A REST2REST service communicates with an existing REST API service facade allowing communication between RESTful interfaces. A REST Exposure is a custom service facade providing an application bound, network-facing service used when RESTful requests are sent to a custom network implementation for translation and processing. Services gatekeeper 100 mediates traffic between users and existing REST infrastructure allowing the application of service level agreements, policy enforcement, security, alarms and statistics for more control over communication services.

Services gatekeeper 100 includes a platform development studio 130. Because all networks are different, matching the particular requirements and capabilities of some networks sometimes means that services gatekeeper 100 must be extended or that certain aspects of it must be closely integrated with existing network functionality. Platform development studio 130 is designed to ease this process by providing for the creation, integration, testing and customization of communication services.

Platform development studio 130 includes a WADL plug-in 132 that creates projects based on the responses that the developer makes to a WADL wizard 134. The WADL wizard 134 generates REST communication services from WADL files representing RESTful web application services. Services gatekeeper 100 can then uses the generated REST communication service to handle RESTful communications between platforms. The WADL wizard can be used to create both REST2REST (e.g. a network plug-in that interfaces with an existing service facade) and REST Exposure services (e.g. a service facade). In one embodiment, WADL plug-in 132 takes WADL files as the only input and automatically generates REST2REST services including server-side and client-side components.

A WADL file is an XML-based (Extensible Markup Language) file format that provides a machine-readable description of HTTP-based web applications. WADL models the resources provided by a service, and the relationships between them. A WSDL file is an XML-based file format that describes the functionality offered by a web service by providing a machine-readable description of how the service can be called, what parameters it expects, and what data structures it returns.

The WADL plug-in 132 generates end to end RESTful communication services. The RESTful communication service offers REST2REST functionality seamlessly with automatic support for the API agnostic features such as policy enforcement, load balancing, routing, failover, logging, accounting, format conversion (XML2JSON,JSON2XML) etc. The WADL plug-in 132 generates the code for the RESTful communication service based on the WADL files and internal templates. The WADL files define the service interface and the templates define the code logic.

Figure 1B:
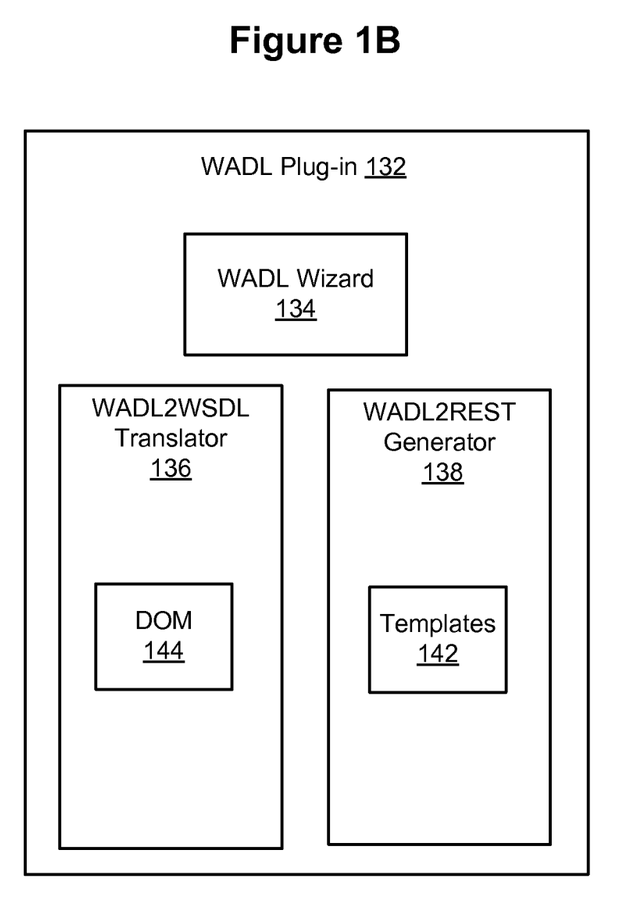
FIG. 1B shows a WADL Plug-in of the services gatekeeper of FIG. 1A, in accordance with an embodiment of the invention.

FIG. 1B shows a WADL plug-in 132 of the services gatekeeper of FIG. 1A, in accordance with an embodiment of the invention. As shown in FIG. 1B, WADL Plug-in 132 comprises a WADL wizard 134 which accepts developer input for selecting WADL files and defining properties of said RESTful web services, a WADL2WSDL translator 136 which translates WADL files into a WSDL file, and a WADL2REST generator 138 which generates REST APIs from the WADL files. As further shown in FIG. 1B, the WADL2REST generator 138 comprises a set of templates 142—the WADL2REST generator 138 generates the REST APIs from the WADL files by binding selected templates of said set of templates 142 with unmarshalled data from the WADL files. The WADL2WSDL translator 136 comprises a direct object model (DOM) 144 which translates unmarshalled data from the WADL files into unmarshalled WSDL data.

The WADL plug-in 132 of FIGS. 1A and 1B can be used to generate end to end RESTful communication service from a WADL files. First the operator uses the WADL wizard 134 to enter service configuration information and select WADL files. The developer chooses a project name and location and the selects each WADL file that includes the service definition to be implemented by the new Communication Service. The developer also selects each WADL file that includes the callback service definition to be used by the new Communication Service in sending information to the service provider's application. The developer then selects REST2REST as the output and selects "finish" to execute. Then the WADL2WSDL translator 136 automatically translates the WADL files into WSDL files. After the translation, the WADL2REST generator 138 automatically generates the RESTful communication service.

Figure 2A:
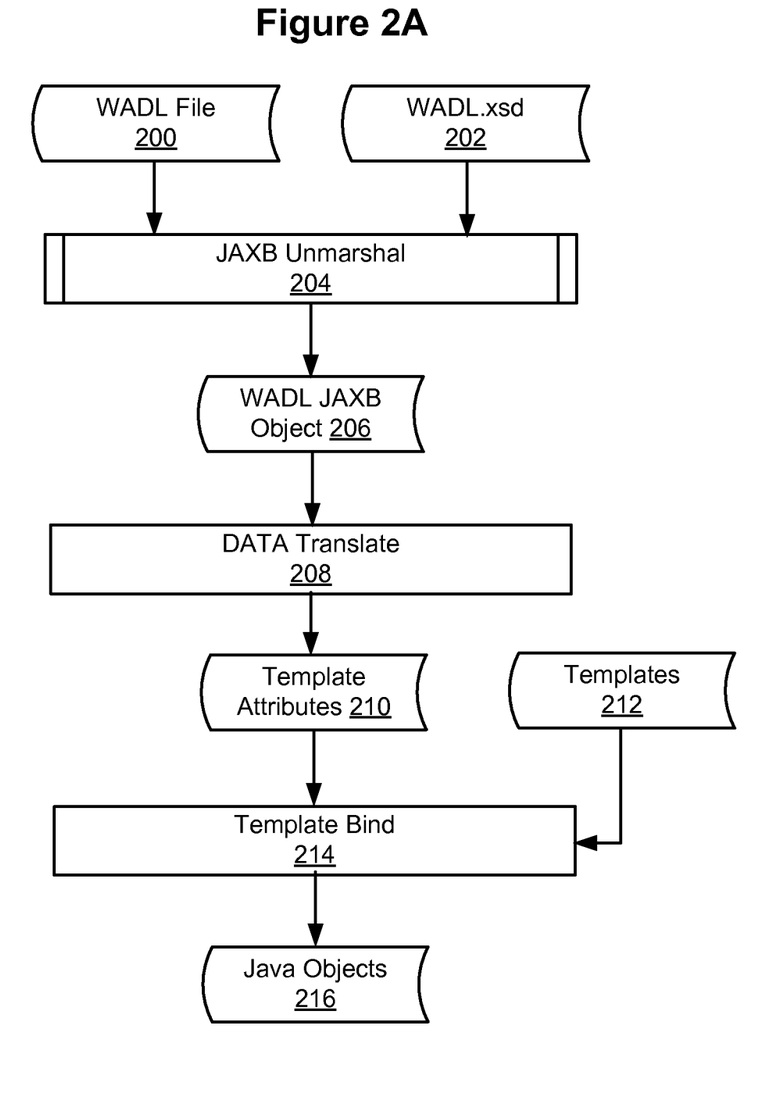
FIGS. 2A-2B show flow for generating an REST to REST communication service from a WADL file in accordance with an embodiment of the invention.
Figure 2B:
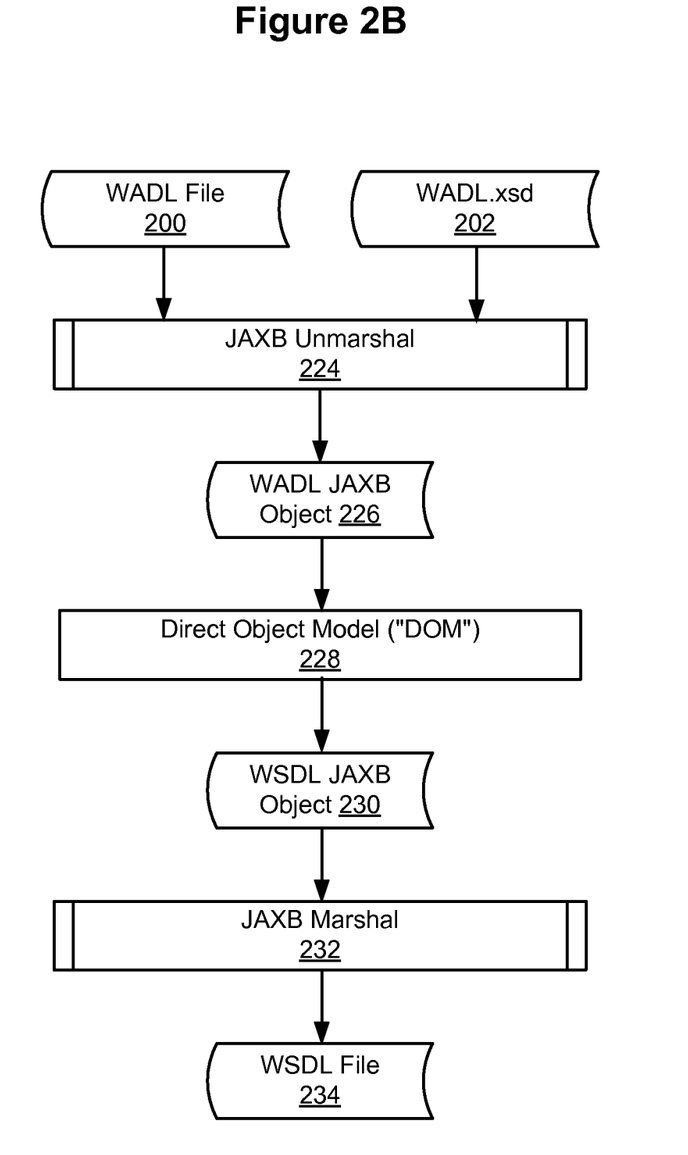

FIGS. 2A-2B show a flow for generating an end to end RESTful communication service from a WADL file using the WADL plug-in 132 of FIGS. 1A and 1B. In general terms, as shown in FIG. 2A, the skeleton of RESTful web application is created from the WADL file, and all Java implementations of web applications in the access tier are generated following the template definitions. In general terms the XML data is extracted from the WADL file, the data is translated to Java objects comprising template attributes, and then the attributes and templates are bound to generate the respective Java class. The WADL file is translated to generate a WSDL file by translation between JAXB POJO objects of WADL and WSDL. The WADL plug-in 132 then generates a Simple Object Access Protocol File (SOAP) utilizing the WSDL file and the JAVA objects. In this manner, the WADL plug-in 132 provides, an easy and quick way to generate REST APIs and offer API agnostic features, automatic code generation of RESTful communication service from WADL files, and WADL to WSDL translation as described in more detail below.

As shown in FIG. 2A, a JAXB unmarshall process 204 is used to unmarshall the XML content of the WADL file 200 into a Java content tree—WADL JAXB object 206. JAXB unmarshall process 204 utilizes the schema WADL.xsd 202 appropriate to WADL file 200. A data translation process 208 is then performed on the WADL JAXB object 206 to generate template attributes 210. In general a compiler uses template attributes 210 and gets data from WADL file 200 as well as enterprise Java™ bean ("EJB") convention data generated from WSDL, and then binds the data to the template to generate the required Java™ resource class. A template binding process 214 is applied using template attributes 210 and templates 212 which define the code logic to generate Java™ objects 216 which include all necessary Java implementations of web applications in the access tier necessary to implement the original WADL file 200. As mentioned above, all java implementations of JAX-RS web applications and communication service are automatically generated based on WADL definition. A JAX-RS web application includes an application and a set of resource classes (one per WADL. file).

As shown in FIG. 2B, the WADL file 200 is translated to generate a WSDL file 234 by translation between JAXB POJO objects of WADL and WSDL. The translation is performed by a WADL to WSDL compiler which translates between Java objects of WADL and WSDL. As shown in FIG. 2A, a JAXB unmarshall process 224 is used to unmarshall the XML content of the WADL file 200 into a Java content tree—WADL JAXB object 226. The JAXB unmarshall process 224 utilizes the schema WADL.xsd 202 appropriate to WADL file 200. The WSDL schema, WSDL.xsd, contains extended elements which can not be bound to a concrete JAXB Objects. These unbound fragments of the WADL xml are parsed and manipulated using a Direct Object Model ("DOM") 228 to generate the corresponding WSDL JAXB Object 230. The WSDL JAXB Object is then marshaled 232 to generate the WSDL file 234.

Figure 3:
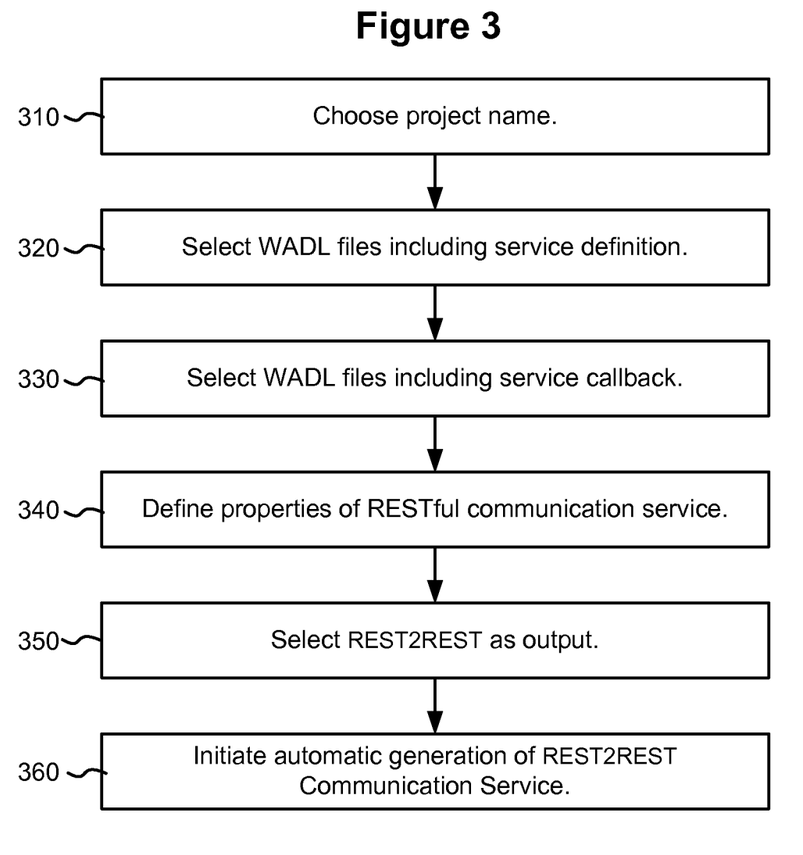
FIG. 3 shows a method implemented by a developer for generating an REST to REST communication service from a WADL file in accordance with an embodiment of the invention.

FIG. 3 shows the method implemented by a developer to create a REST2REST communication service project using the WADL plug-in 132 and WADL wizard 134. At step 310, the developer chooses a project name and location. At step 320, the developer selects each WADL file that includes the service definition to be implemented by the new Communication Service. At step 330, the developer also selects each WADL file that includes the callback service definition to be used by the new Communication Service in sending information to the service provider's application. At step 340, the developer the defines the properties of the RESTful communication service including, for example: Company (the company name, to be used in META-INF/MANIFEST.MF); Version (the version, to be used in META-INF/MANIFEST.MF); Identifier (an identifier to tie together a collection of Web Services or Communication Service); Service type (the service type used in EDRs, statistics, e.g., Rest2RestXsi_Actions); Java Class Package Name (the package names to be used, e.g. oracle.ocsg.rest2rest); Web Services Context path (the context path for the Web Service e.g., /xsi_actions). At step 350, the developer selects REST2REST as the output type: the selection to generate a REST2REST communication service. At step 360, the developer initiates the WADL plug-in 232 which automatically generates REST2REST communication services from the selected WADL files representing RESTful web application services as described with respect to FIGS. 2A and 2B.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for automatically generating a representational state transfer architecture (RESTful) web service comprising REST API code from Web Application Description Language (WADL) files, the system comprising:
   one or more microprocessors;
   a WADL wizard executing on said one or more microprocessors;
   a WADL2WSDL translator which generates a Web Services Description Language (WSDL) file utilizing said WADL files;
   a WADL2REST generator which comprises a set of templates defining code logic;
   wherein the WADL2REST generator generates said REST API code from said WADL files by binding selected templates of said set of templates defining code logic with unmarshalled data from said WADL files; and wherein the system generates an end to end RESTful web service utilizing said WSDL file and said REST API code generated by said WADL2REST generator thereby generating an end to end RESTful web service comprising said REST API code.

2. The system of claim 1, wherein the WADL2REST generator extracts data from said WADL files, generates program objects comprising attributes of said templates, and binds said attributes and said selected templates to generate a program object class comprising said REST API code.

3. The system of claim 1, wherein:
the WADL2WSDL translator comprises a Direct Object Model (DOM); and
wherein the DOM translates unmarshalled data from said WADL files into unmarshalled WSDL data.

4. The system of claim 1, wherein:
the WADL2REST generator generates said program objects from said WADL files by binding selected templates of said set of templates with unmarshalled data from said WADL files; and
the WADL2WSDL translator comprises a Direct Object Model (DOM) which translates unmarshalled data from said WADL files into unmarshalled WSDL data.

5. The system of claim 1, wherein:
the WADL wizard accepts developer input for selecting WADL files and defining properties of said RESTful web service.

6. The system of claim 1, wherein the RESTful web service is a REST2REST web service.

7. The system of claim 1, wherein:
said end to end RESTful web service provides automatic support for API agnostic features including one or more of policy enforcement, load balancing, and failover.

8. A method operating on one or more microprocessor for automatically generating a representational state transfer architecture (RESTful) web service comprising REST API code from Web Application Description Language (WADL) files, the method comprising:
receiving developer input selecting WADL files and defining properties of said RESTful web service;
translating said WADL files into a Web Services Description Language (WSDL) file;
providing a set of templates defining code logic;
generating said REST API code from said WADL files by binding selected templates of said set of templates defining code logic with unmarshalled data from said WADL files; and
creating an end to end RESTful web service from said WSDL files and said REST API code generated from said WADL files thereby generating an end to end RESTful web service comprising said REST API code.

9. The method of claim 8, wherein:
said generating step comprises generating said program objects from said WADL files by extracting data from said WADL files, generating program objects comprising attributes of said templates, and binding said attributes and said selected templates to generate a program object class comprising said REST API code.

10. The method of claim 8, wherein said translating step comprises translating said WADL file into a WSDL file by using a Direct Object Model (DOM) to translate unmarshalled data from said WADL files into unmarshalled WSDL data.

11. The method of claim 8, wherein the RESTful web service is a REST2REST web service.

12. A non-transitory computer readable storage medium including instructions stored thereon for automatically generating a representational state transfer architecture (RESTful) web service comprising REST API code, which instructions, when executed by a computer, cause the computer to perform steps comprising:
receiving developer input selecting Web Application Description Language (WADL) files and defining properties of said RESTful web service;
translating said WADL files into a Web Services Description Language (WSDL) file;
providing a set of templates defining code logic;
generating said REST API code from said WADL files by binding selected templates of said set of templates defining code logic with unmarshalled data from said WADL files; and
creating an end to end RESTful web service from said WSDL the file and said REST API code generated from said WADL files thereby generating an end to end RESTful web service comprising said REST API code.

13. The non-transitory computer readable storage medium of claim 12, wherein the instructions stored thereon, when executed by a computer, further cause the computer to perform the steps comprising:
generating program objects from said WADL files by extracting data from said WADL files, generating program objects comprising attributes of said templates, and binding said attributes and said selected templates to generate a program object class comprising said REST API code.

14. The non-transitory computer readable storage medium of claim 12, wherein the instructions stored thereon, when executed by a computer, further cause the computer to perform the steps comprising:
translating said WADL files into a WSDL file by using a Direct Object Model (DOM) to translate unmarshalled data from said WADL files into unmarshalled WSDL data.

15. The non-transitory computer readable storage medium of claim 12, wherein the RESTful web service is a REST2REST web service.

16. The non-transitory computer readable storage medium of claim 12, wherein the instructions stored thereon, when executed by a computer, further cause the computer to perform the steps comprising:
generating program objects from said WADL files by binding selected templates of said set of templates with unmarshalled data from said WADL files; and
translating said WADL file into a WSDL file by using a Direct Object Model (DOM) to translate unmarshalled data from said WADL files into unmarshalled WSDL data.

* * * * *

UNITED STATES PATENT AND TRADEMARK OFFICE
CERTIFICATE OF CORRECTION

| | | |
|---|---|---|
| PATENT NO. | : 8,856,735 B2 | Page 1 of 1 |
| APPLICATION NO. | : 13/557470 | |
| DATED | : October 7, 2014 | |
| INVENTOR(S) | : Nimashakavi et al. | |

It is certified that error appears in the above-identified patent and that said Letters Patent is hereby corrected as shown below:

In the Claims

In column 8, line 24, in Claim 12, delete "the file" and insert -- file --, therefor.

Signed and Sealed this
Fifth Day of May, 2015

Michelle K. Lee
*Director of the United States Patent and Trademark Office*